US008769654B2

(12) United States Patent
Tang et al.

(10) Patent No.: US 8,769,654 B2
(45) Date of Patent: Jul. 1, 2014

(54) COUNTERFEIT PREVENTION STRATEGY FOR PLUGGABLE MODULES

(75) Inventors: Norman Tang, Los Altos, CA (US); Adam Jonathan Carter, San Jose, CA (US); David C. Lai, Mountain View, CA (US); Liang Ping Peng, Santa Clara, CA (US); Guoying Ding, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 1158 days.

(21) Appl. No.: 12/489,608

(22) Filed: Jun. 23, 2009

(65) Prior Publication Data

US 2010/0325432 A1 Dec. 23, 2010

(51) Int. Cl.
| | |
|---|---|
| *G06F 17/30* | (2006.01) |
| *G06F 7/04* | (2006.01) |
| *H04L 9/32* | (2006.01) |
| *G06F 21/85* | (2013.01) |

(52) U.S. Cl.
CPC ..................................... *G06F 21/85* (2013.01)
USPC ........ 726/9; 726/3; 726/18; 726/20; 713/153; 713/164; 713/165

(58) Field of Classification Search
USPC ............... 726/3, 9, 18, 20; 713/153, 164, 165
See application file for complete search history.

(56) References Cited

U.S. PATENT DOCUMENTS

| | | | |
|---|---|---|---|
| 5,268,963 A | 12/1993 | Monroe et al. | |
| 5,434,870 A | 7/1995 | Benton et al. | |
| 5,778,072 A * | 7/1998 | Samar ............................. | 380/30 |
| 5,781,723 A | 7/1998 | Yee et al. | |
| 5,933,503 A | 8/1999 | Schell et al. | |
| 6,073,118 A | 6/2000 | Gormish et al. | |
| 6,137,805 A | 10/2000 | Berstis | |
| 6,192,420 B1 | 2/2001 | Tsai et al. | |
| 6,220,873 B1 | 4/2001 | Samela et al. | |
| 6,285,990 B1 | 9/2001 | Lee et al. | |
| 6,484,128 B1 | 11/2002 | Sekiya et al. | |
| 6,546,487 B1 | 4/2003 | McManis | |

(Continued)

FOREIGN PATENT DOCUMENTS

| | | |
|---|---|---|
| CN | 101163014 A | 4/2008 |
| CN | 1532659 A | 9/2008 |

OTHER PUBLICATIONS

Chinese Office Action, Chinese Patent Application No. 2010102135518, Nov. 29, 2012, with English translation and search report.

(Continued)

*Primary Examiner* — Mohammad W Reza

(74) *Attorney, Agent, or Firm* — Novak Druce Connolly Bove + Quigg LLP

(57) ABSTRACT

A method is provided, including (a) upon a standard small form-factor pluggable (SFP) module being inserted into an SFP jack on a network host device, determining if the SFP module is a legacy device or a smart device, (b) upon determining that the SFP module is a legacy device, receiving a magic code from the SFP module and determining if the magic code is a valid magic code, and (c) upon determining that the SFP module is a smart device, performing a smart authentication process with the SFP module. Associated apparatuses and additional methods are also provided.

18 Claims, 6 Drawing Sheets

(56) References Cited

U.S. PATENT DOCUMENTS

| | | |
|---|---|---|
| 6,563,600 B1 | 5/2003 | Young |
| 6,571,335 B1 | 5/2003 | O'Donnell et al. |
| 6,615,350 B1 | 9/2003 | Schell et al. |
| 6,629,061 B1 | 9/2003 | Shaffer |
| 6,804,727 B1 | 10/2004 | Rademacher |
| 6,816,968 B1 | 11/2004 | Walmsley |
| 7,234,061 B1 | 6/2007 | Diab et al. |
| 7,272,728 B2 | 9/2007 | Pierson et al. |
| 7,366,551 B1 | 4/2008 | Hartley |
| 7,394,997 B2 | 7/2008 | Mei et al. |
| 7,502,942 B1 | 3/2009 | Mahmoud |
| 7,845,016 B2 | 11/2010 | Diab et al. |
| 8,280,249 B2 * | 10/2012 | Friedrich et al. ............ 398/33 |
| 2003/0004887 A1 | 1/2003 | Roszak |
| 2003/0037239 A1 | 2/2003 | Leung et al. |
| 2003/0200149 A1 | 10/2003 | Gonzalez et al. |
| 2003/0236998 A1 | 12/2003 | Gilstrap et al. |
| 2004/0031030 A1 | 2/2004 | Kidder et al. |
| 2004/0044631 A1 | 3/2004 | Walker et al. |
| 2004/0073726 A1 | 4/2004 | Margalit et al. |
| 2005/0073389 A1 | 4/2005 | Chandley |
| 2005/0114880 A1 | 5/2005 | Gould |
| 2005/0201380 A1 | 9/2005 | Saleh et al. |
| 2005/0278438 A1 | 12/2005 | Sandaire |
| 2006/0101517 A1 | 5/2006 | Banzhof et al. |
| 2006/0251253 A1 | 11/2006 | Kappler et al. |
| 2006/0265742 A1 | 11/2006 | Rommelmann et al. |
| 2007/0083916 A1 | 4/2007 | Coyle |
| 2007/0124413 A1 | 5/2007 | Diab et al. |

OTHER PUBLICATIONS

Menezes, Alfred J. et al., Handbook of Applied Cryptography, CRC Press, Washington DC, 1997, p. 363.

Computer Hope, Definition of "Serial Number," 1998-2006, www.computerhope.com/jargon/s/serinumb.htm.

* cited by examiner

Fig. 3

|  | Old host / old software | Old host / new software | New host / new software |
|---|---|---|---|
| Legacy SFP | Host receives magic code from SFP and verifies using magic key | Host reads legacy identification code from SFP and then receives magic code from SFP to verify using magic key | Host reads legacy identification code from SFP and then rejects SFP |
| New SFP | Host receives magic code from SFP (stored in hardened memory within authentication chip) and verifies using magic key | Host reads new identification code from SFP and then performs smart authentication | Host reads new identification code from SFP and then performs smart authentication |

90

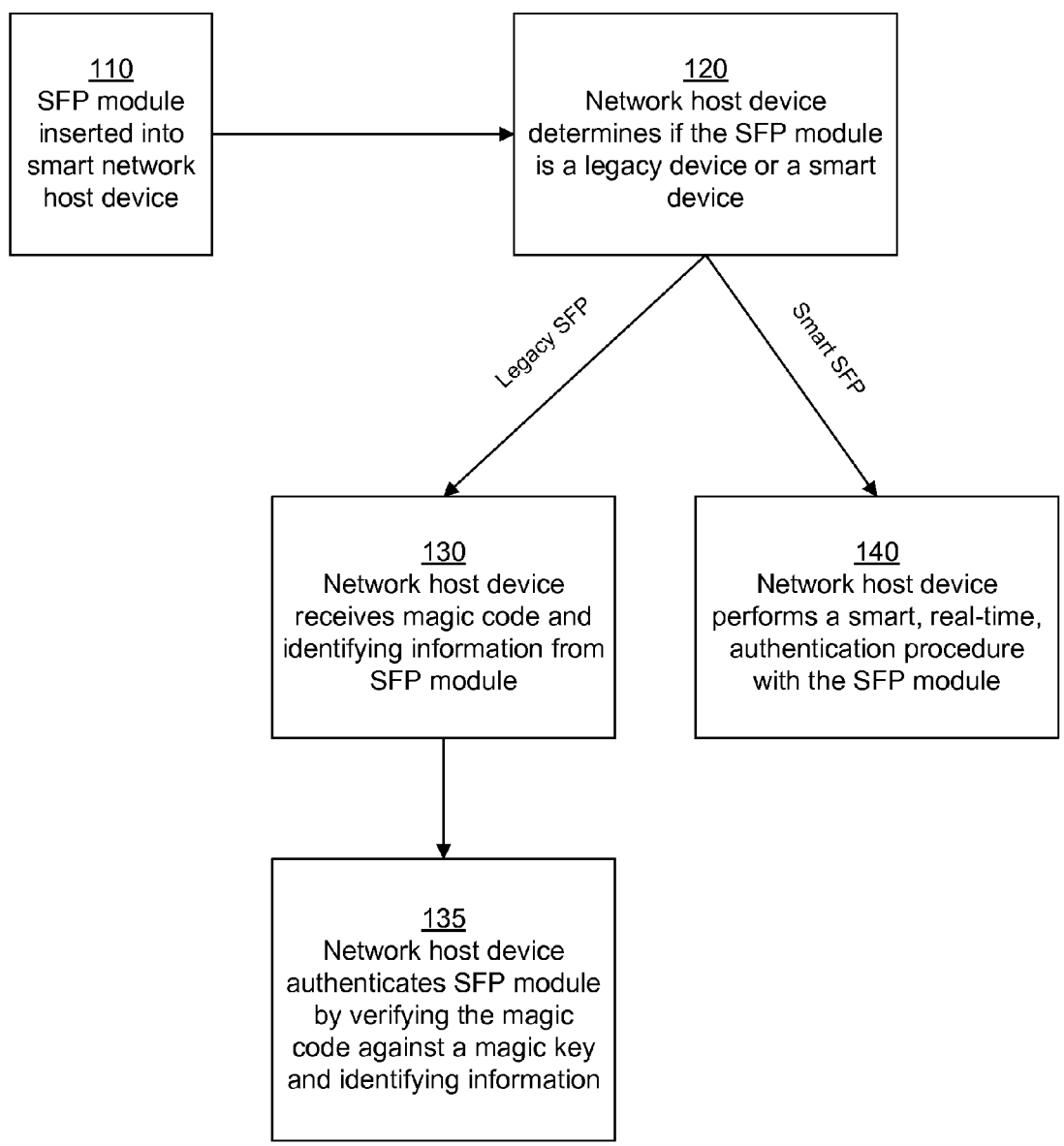

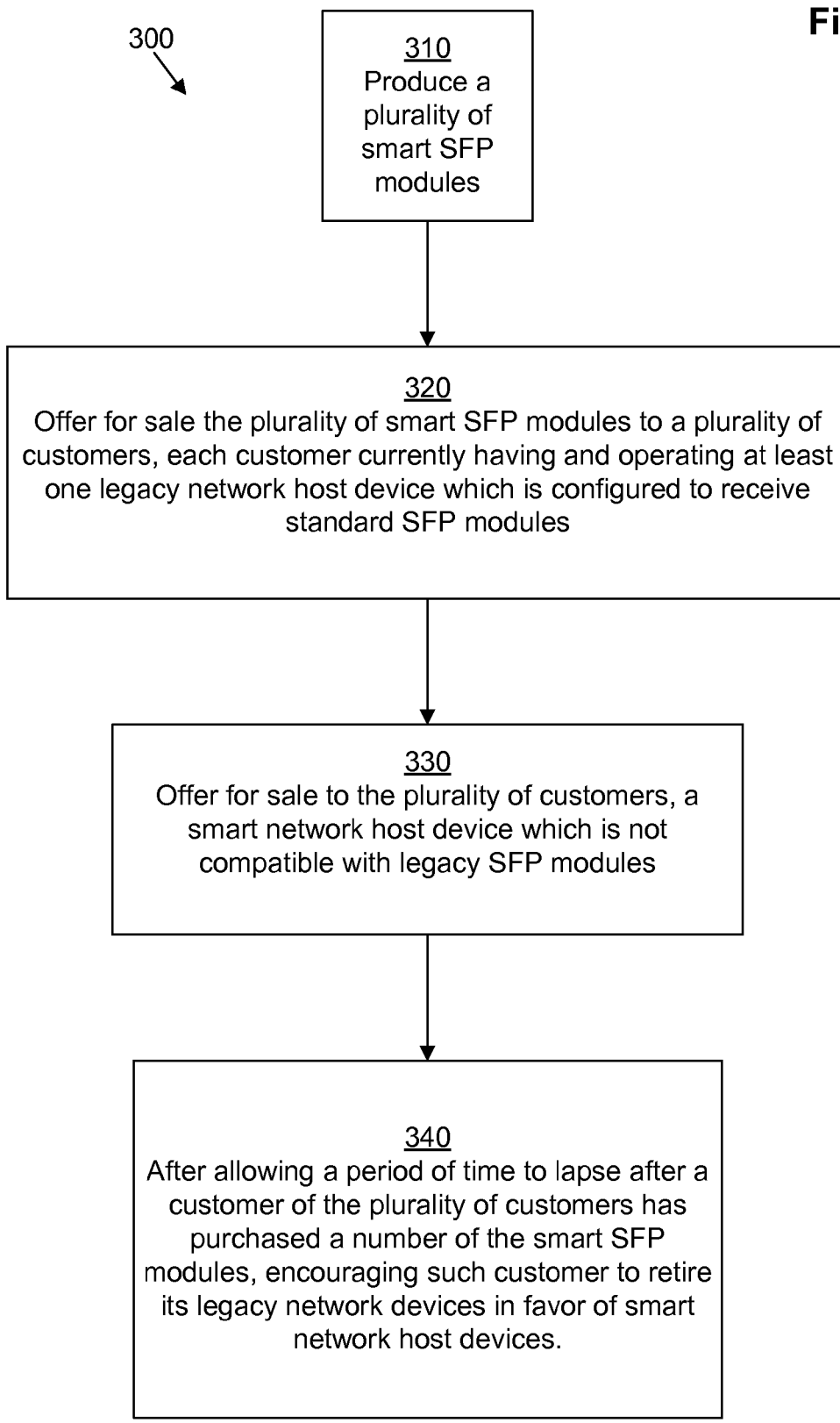

COUNTERFEIT PREVENTION STRATEGY FOR PLUGGABLE MODULES

BACKGROUND

Some manufacturers provide electronic devices that use off-the-shelf third-party vendor components. Some electronic device manufacturers further offer to qualify such vendor components (e.g., test the vendor components under strict conditions) and, if the vendor components qualify, certify that the vendor components are from an "approved" vendor. An end customer who purchases an electronic device from an electronic device manufacturer and a component from an approved vendor typically receives an extra assurance from the electronic device manufacturer that the electronic device and the component will work normally when the component is properly installed and configured within the electronic device. On the other hand, an end customer who purchases an off-the-shelf component which is not from an approved vendor may receive no assurance from the electronic device manufacturer that the component will work properly within the device.

When an electronic device using components from a non-approved vendor fails, it can be difficult and expensive for the electronic device manufacturer to determine whether the failure is a result of a problem in the device itself or the components from the non-approved vendor. Accordingly, electronic device manufacturers often only agree to support device configurations which exclusively use components from an approved vendor. For device configurations that do not exclusively use components from an approved vendor, the electronic device manufacturer may not make any guarantees or may not provide any warrantees.

Small Form-factor Pluggable (SFP) modules are compact, hot-pluggable transceivers used in telecommunication and data communications. They interface a network host device motherboard (for a switch, router, media converter or similar device) to a fiber optic or copper networking cable in a modular manner. In order to prevent counterfeiting of SFP modules, some manufacturers place read-only memory storing a magic code on SFP modules, allowing the network host device to read the magic code and other identifying information from the SFP and determine if the magic code was generated using a secret magic key known only to approved vendors. A similar technique is disclosed in U.S. Pat. No. 7,234,061 to Diab, et al. (2007), the teachings of which are hereby incorporated by reference in their entirety.

BRIEF DESCRIPTION OF THE DRAWINGS

Objects, features, and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

FIG. 3 illustrates an example authentication matrix of various components according to one embodiment.

FIG. 4 illustrates a first example method of one embodiment.

FIG. 5 illustrates a second example method of another embodiment.

DETAILED DESCRIPTION

Overview

Figure 1:
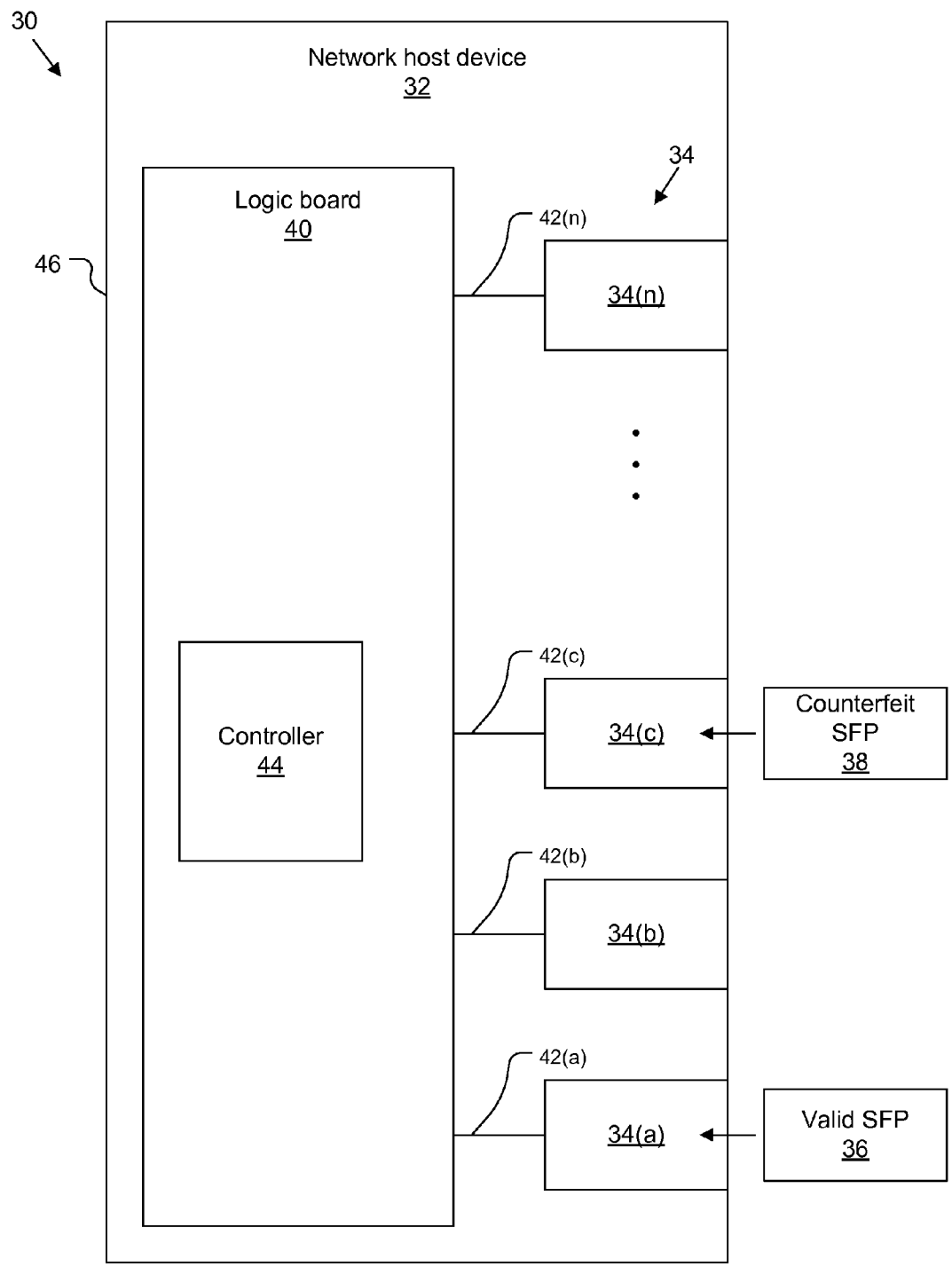
FIG. 1 illustrates an example network host device and accompanying system according to one embodiment.

Further improvements can be made over a conventional magic code mechanism to ensure that it is not possible for a non-approved vendor to simply copy the entire contents of read-only memory (including the identifying information and the magic code) from a chip made by an approved vendor and place the copied data in the memory of a newly-manufactured chip. Along these lines, certain embodiments of the present invention are directed towards techniques for preventing this form of counterfeiting. The improvements reduce the risk of counterfeit modules that may cause user systems to operate incorrectly.

In particular, in one embodiment, an apparatus is provided having (a) a first communications configured to communicatively couple to a network plug of a network cable, (b) a second communications interface configured to communicatively couple to a network host device, the second communications interface being constructed and arranged to mount into an opening of the network host device, the network host device being constructed and arranged to receive and mount a standard small form-factor pluggable module in the opening, (c) a microcontroller, the microcontroller being configured to perform transceiver functions between the first communications interface and the second communications interface, and (d) authentication circuitry, the authentication circuitry being distinct from the microcontroller. The authentication circuitry is configured to provide a legacy-style authentication when the second communications interface is communicatively coupled to a legacy network host device. The authentication circuitry is configured to provide a smart authentication when the second communications interface is communicatively coupled to a smart network host device, the smart authentication being less susceptible to counterfeiting than the legacy-style authentication.

In another embodiment, an apparatus is provided having (a) an enclosure, the enclosure having a plurality of openings therein, each opening being constructed and arranged to receive a standard small form-factor pluggable (SFP) module and (b) a logic board mounted within the enclosure, the logic board including a controller and a plurality of signal connectors, each of the plurality of signal connectors aligning with a different opening of the plurality of openings such that an SFP module, when inserted into the opening, interfaces with the signal connector. The controller is configured to (1) upon an SFP module being inserted into an opening and interfacing with a signal connector, determine if the SFP module is a legacy device or a smart device, (2) upon determining that the SFP module is a legacy device, receive a magic code from the SFP module and determine if the magic code is a valid magic code, and (3) upon determining that the SFP module is a smart device, perform a smart authentication process with the SFP module.

In yet another embodiment, a method is provided, including (a) upon a standard small form-factor pluggable (SFP) module being inserted into an SFP jack on a network host device, determining if the SFP module is a legacy device or a smart device, (b) upon determining that the SFP module is a legacy device, receiving a magic code from the SFP module and determining if the magic code is a valid magic code, and (c) upon determining that the SFP module is a smart device, performing a smart authentication process with the SFP module.

DESCRIPTION OF EXAMPLE EMBODIMENTS

FIG. 1 depicts an example system 30 for preventing counterfeit Small Form-factor Pluggable (SFP) modules according to one embodiment. System 30 includes smart network host device 32, having a plurality of SFP jacks 34 (or carriers or rails) for receiving SFP modules. Also depicted are a valid SFP module 36, made by an approved manufacturer, and a counterfeit SFP module 38, made by a non-approved manufacturer, SFP modules 36, 38 being inserted into SFP jacks 34. Smart network host device 40 also includes a logic board (or motherboard) 40, which is communicatively coupled to each of the SFP jacks 34 by means of a plurality of signal connectors 42. Logic board 40 contains a controller 44 and is enclosed by enclosure 46, which contains openings for the SFP jacks 34.

In operation, SFP modules 36, 38 are inserted into SFP jacks 34, and are authenticated by controller 44. Valid SFP modules 36 are validated, while counterfeit SFP modules 38 may be rejected. Further details regarding the operation of the validation process is provided below (in connection with FIGS. 3-7). Once the SFP modules 36 are validated, controller 44 operates to control the operation of the smart network host device according to its intended basic function (for example, as a switch, hub, router, media converter, or similar device).

Figure 2:
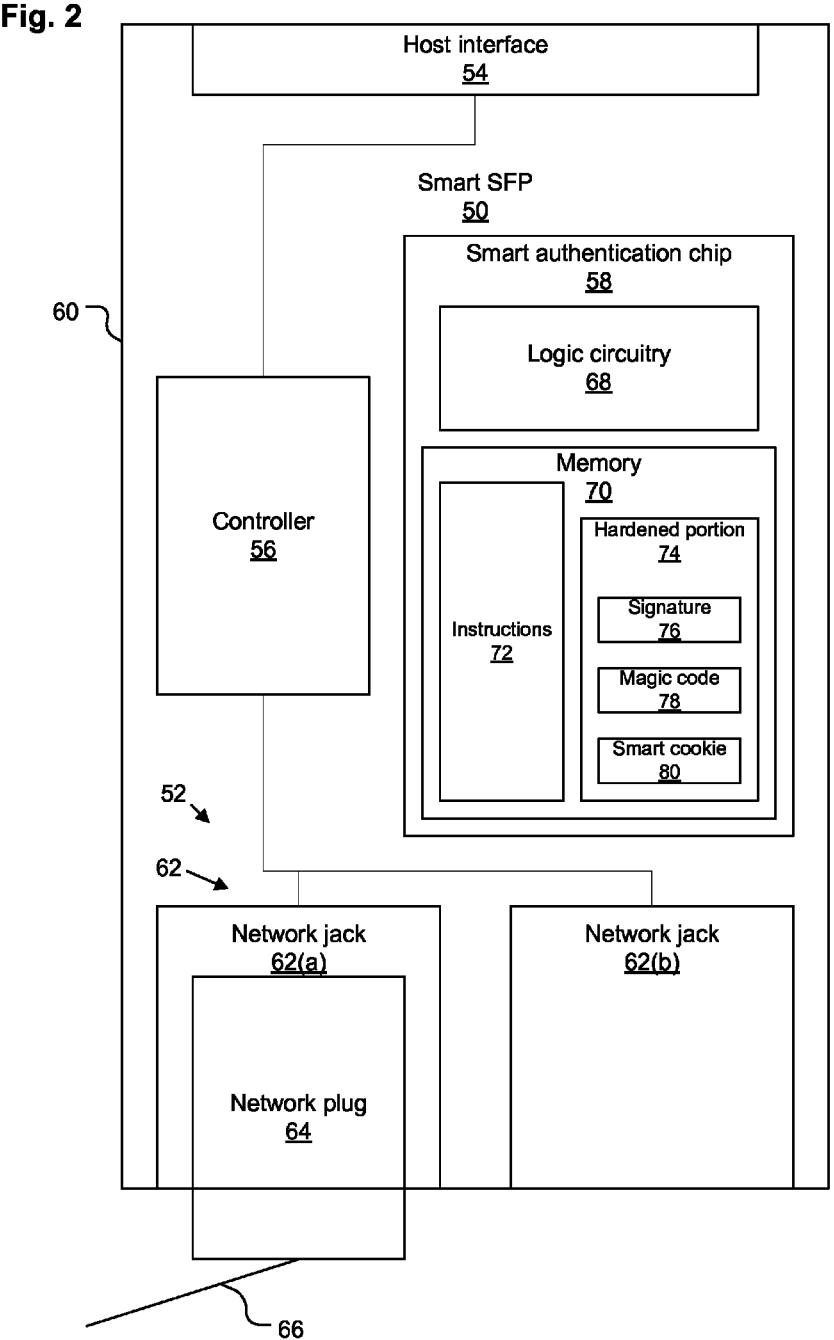
FIG. 2 illustrates an example SFP module according to one embodiment.

FIG. 2 depicts an example smart SFP module 50 of one embodiment. Smart SFP module 50 includes a network cable interface portion 52, a host interface 54, a controller 56, a smart authentication chip 58, and a housing 60, which encloses the SFP module 50, the housing 60 being constructed and arranged to mount in a standard SFP module jack of a network host device, such as SFP jacks 34 of smart network host device 32 (see FIG. 1). Network cable interface portion 52, may include, for example, two network interface jacks 62(a), 62(b) (generally, network interface jacks 62). Network interface jacks 62 may be of various types (e.g., RJ-45, LC). As depicted, one network cable interface jack 62(a) is mated to network plug 64, while the other network cable interface jack 62(b) is empty. Network plug 64 connects to a network cable 66 (e.g., a copper twisted pair or fiber optic cable). Controller 56 controls operation of the SFP module 50, performing, inter alia, transceiving functions.

Smart authentication chip 58 includes logic circuitry 68 and memory 70. Memory 70 stores instructions 72 for performing a smart authentication to be executed by logic circuitry 68. Memory 70 also includes hardened portion 74. The hardened portion 74 of memory 70 includes features which inhibit the contents of the memory 70 from being accessed by an unauthorized entity. For example, hardened portion 74 may be surrounded by lamination, such that if someone were to attempt to remove the lamination in order to tap the wires of the hardened portion 74, the contents of the hardened portion 74 would become unreadable due to damage caused be removal of the lamination. Various other well-known techniques for hardening the hardened portion 74 may also be utilized. Hardened portion stores a unique signature 76, which is uniquely associated with each chip produced. Hardened portion 74 also stores a magic code section 78, which stores part or all of what would have been contained within the read-only memory of a legacy SFP module, such as identifying information and a magic code cryptographically computed using the identifying information and a secret magic key known only to authorized agents, such as approved vendors. Hardened portion 74 also stores a smart cookie portion 80, which includes information necessary to perform a smart authentication procedure, as will be discussed in further detail below. It should be understood that while instructions 72 have been depicted as being stored in memory 70 outside the hardened portion 74, in some embodiments, instructions 72 may also be stored within hardened portion 74. It should also be understood that while memory 70 and hardened portion 74 are depicted as residing within the smart authentication chip 58, in some embodiments, one or both of these portions may reside external to the authentication chip. It should be understood that smart authentication chip 58 may be an off-the-shelf component, such as the ACT-IT microchip provided by Cisco Systems, Inc. of San Jose, Calif., programmed with data particular to this application within memory 70.

In operation, the smart SFP module 50 is inserted into an SFP jack 34 of a smart network host device 32 or into a conventional SFP jack of a legacy network host device. Controller 56 and smart authentication chip 58 perform an authentication procedure with the smart network host device 32 or the legacy network host device as described below in further detail (in connection with FIGS. 3-7). Once the smart SFP module 50 has been validated, controller 56 controls operation of the smart SFP module 50 according to its normal mode of operation, performing transceiving functions between the host interface 54 and the network cable interface portion 52.

FIG. 3 depicts an example authentication matrix 90 according to one embodiment. Both legacy and smart (or new) SFP modules can coexist within the same system 30, in the same network host device 32. Similarly, the SFP modules may be installed in legacy network host devices or in smart network host devices 32. In some cases, it may be possible to upgrade (by installing new software) a legacy network host device to operate in a fashion which is partially compatible with various embodiments. It may also be similarly possible to configure a smart network host device 32 to operate in a manner which is compatible with legacy SFP modules (not depicted, but similar to the old host/new software approach).

As depicted in the authentication matrix 90, if a legacy SFP module is installed in a legacy network host device (running legacy software), the SFP module is authenticated in the legacy way using a magic code stored in read-only memory of the SFP module. As noted above, this is vulnerable to counterfeiting by copying the read-only memory from one SFP module to another. If a smart SFP module 50 is installed into a legacy network host device, then the smart SFP module 50 is capable of emulating the legacy authentication procedure. In such a case, instructions 72 stored within the smart authentication chip 58 direct the logic circuitry to send the contents of the magic code portion 78 (and in some cases the signature portion 76) to the legacy network host device across host interface 54. From the perspective of the legacy network host device, the smart SFP module 50 appears to be a standard legacy SFP module.

Looking at the rightmost column of the authentication matrix 90, if a legacy SFP module is installed in a smart network host device 32 (configured to operate in a non-compatible mode), then the legacy SFP module will be rejected as incompatible. However, if a smart SFP module 50 is installed into a smart network host device 32 (regardless of how the smart network host device 32 is configured) then the smart network host device 32 performs a smart authentication procedure with the smart SFP module 50. Further details of the methods performed by the smart network host device 32 are provided in FIG. 4.

FIG. 4 depicts an example method 100. In step 110, an SFP module is inserted into a smart network host device 32. Upon detecting the insertion of the SFP module, smart network host device 32 determines if the SFP module is a legacy device or a smart device (step 120). In one embodiment, this is accomplished through the use of a data field within either the read-only memory of a legacy SFP module or the signature portion 76 of a smart SFP module 50 (see FIG. 2). For example, in a legacy SFP module, the read-only memory stores a "vendor name" field, which is typically populated with a value such as, for example, CISCO-VENDOR (where VENDOR may represent the name of an approved vendor). However, in a smart SFP module 50, the corresponding field stored within memory 70 of authentication chip 58 instead stores a different value such as, for example, CISCO (or some other pre-defined representation). Thus, if the smart network host device 32 receives the value CISCO in the vendor name field, then it may determine that the SFP module is a smart SFP module 50. Otherwise, the smart network host device 32 may determine that the SFP module is a legacy device.

If the smart network host device 32 determines that the installed SFP module is a legacy device, then a legacy-style authentication procedure is performed. The SFP module is directed to send the contents of its read-only memory (including a magic code and identifying information) to the smart network host device 32 (step 130), and the smart network host device 32 is able to authenticate the magic code according the legacy technique (using the magic code, identifying information, and the secret magic key) (step 135).

If the smart network host device 32 determines that the installed SFP module is a smart SFP module 50, then a smart authentication procedure is performed in order to authenticate the smart SFP module 50 as being not counterfeit (step 140). In some embodiments, this smart authentication procedure is a real-time algorithm. In one embodiment, the real-time algorithm is a challenge-response algorithm. In such an embodiment, smart network host device 32 sends a first message (for example, a randomly generated string) to the smart SFP module 50. In response, the smart SFP module 50 (in particular, the logic circuitry, following instructions 72) encrypts the first message using a key based on information stored within the signature portion 76 and/or the smart cookie portion 80 of the hardened memory 74 to generate a second message. The smart SFP module 50 then sends the second message back to the smart network host device 32 for verification. In another embodiment, the real-time algorithm is a time-based algorithm. In such an embodiment, smart network host device 32 signals the smart SFP module 50 to perform an authentication, and the smart SFP module 50 (in particular, the logic circuitry, following instructions 72) encrypts the current time using a key based on information stored within the signature portion 76 and/or the smart cookie portion 80 of the hardened memory 74 to generate a reply message. The smart SFP module 50 then sends the reply message back to the smart network host device 32 for verification.

Referring back to FIG. 3, if a legacy SFP is inserted into a legacy network host device running upgraded software (or alternatively, a smart network host device 32 configured to operate in a compatible manner), then the legacy network host device running upgraded software (or the smart network host device 32 configured to operate in a compatible manner) reads the vendor name field (or any other field used to distinguish legacy and smart SFP modules) as described above in connection with step 120 of FIG. 4, and upon determining that the SFP module is legacy, receives the magic code from the legacy SFP module and verifies it with a legacy-style authentication. If however, the vendor name field (or any other field used to distinguish legacy and smart SFP modules) indicates that the SFP module is smart, then the legacy network host device running upgraded software (or the smart network host device 32 configured to operate in a compatible manner) authenticates the smart SFP module 50 according to the process described above in connection with step 140 of FIG. 4.

FIG. 5 illustrates an example method 300 performed under the direction of a manufacturer or authenticator of network host devices and SFP modules. In step 310, a plurality of smart SFP modules 50 (as described above) are produced. In step 320, the manufacturer offers these smart SFP modules 50 for sale to a plurality of customers, each customer currently having and operating at least one legacy network host device which is configured to receive standard SFP modules. In step 330, the manufacturer offers for sale to the customers a smart network host device 32 which is not compatible with legacy SFP modules. In step 340, after allowing a period of time to lapse after a customer of the plurality of customers has purchased a number of smart SFP modules 50, the manufacturer encourages such customer to retire its legacy network devices in favor of smart network host devices 32. Thereafter, the customer will no longer be susceptible to counterfeit SFP modules 38 (made by copying the read-only memory of a pre-existing valid SFP module 36). The period of time in step 330 might, for example, be a period in the range of 6-12 months.

Figure 6:
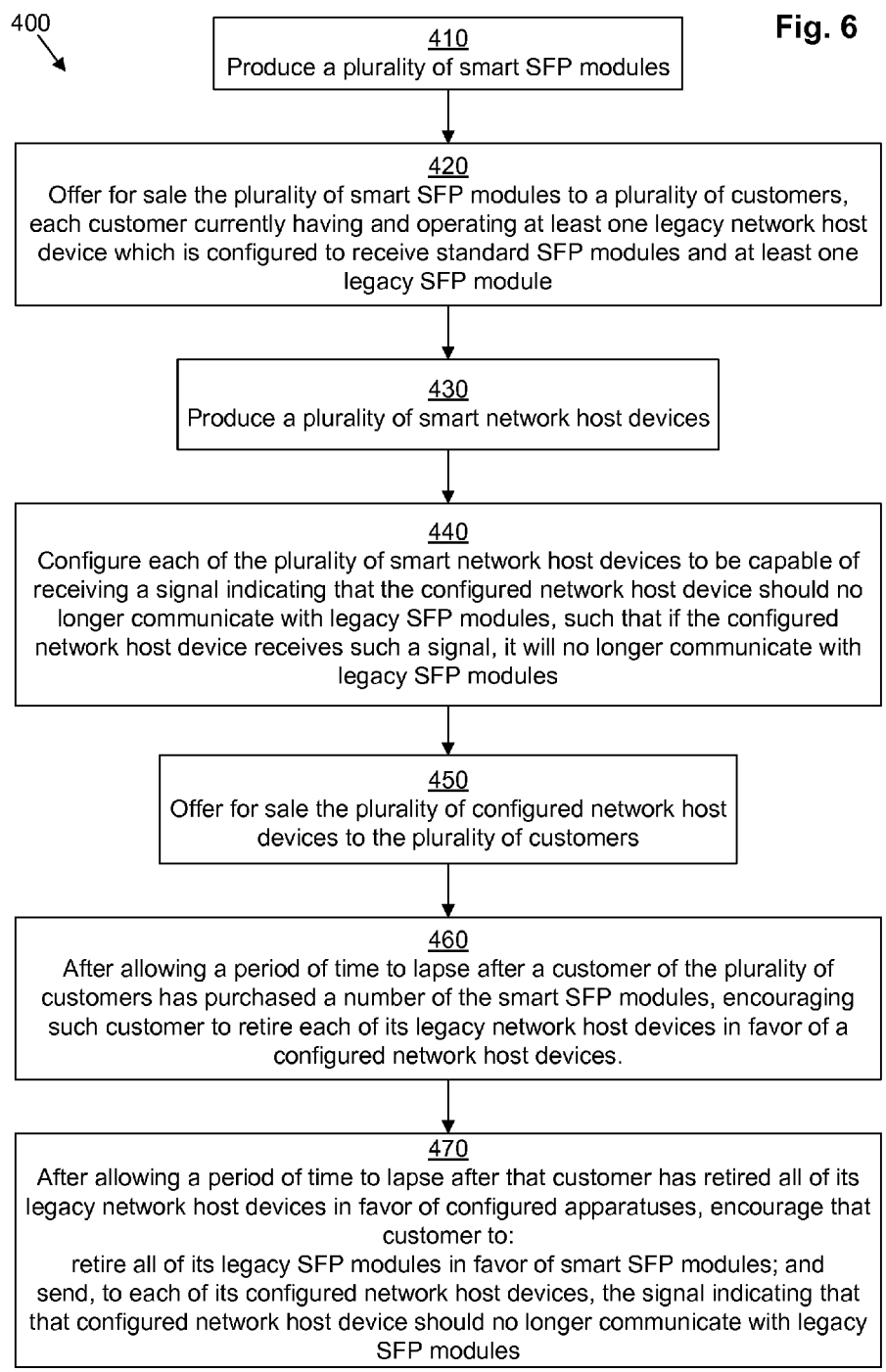
FIG. 6 illustrates a third example method of another embodiment.

FIG. 6 illustrates an example method 400 performed under the direction of a manufacturer or authenticator of network host devices and SFP modules. In step 410, a plurality of smart SFP modules 50 (as described above) are produced. In step 420, the manufacturer offers these smart SFP modules 50 for sale to a plurality of customers, each customer currently having and operating at least one legacy SFP module and at least one legacy network host device which is configured to receive standard SFP modules. In step 430, manufacturer produces a plurality of smart network host devices 32 (as described above). In step 440, manufacturer configures each of the plurality of smart network host devices 32 to be capable of receiving a signal indicating that the smart network host devices 32 should no longer communicate with legacy SFP modules, such that if the smart network host devices 32 receives such a signal, that smart network host devices 32 will no longer communicate with legacy SFP modules. In step 450, the manufacturer offers the plurality of configured smart network host devices 32 for sale to the customers. In step 460, after allowing a period of time to lapse after a customer has purchased a number of the smart SFP modules 50, the manufacturer encourages such customer to retire each of its legacy network host devices in favor of a configured network host device 32. In step 470, after allowing a period of time to lapse after that customer has retired all of its legacy network host devices in favor of configured network host devices 32, the manufacturer encourages that customer to (a) retire all of its legacy SFP modules in favor of smart SFP modules 50, and (b) send, to each of its configured smart network host devices 32, the signal indicating that that configured network host device 32 should no longer communicate with legacy SFP modules. Thereafter, the customer will no longer be susceptible to counterfeit SFP modules 38 (made by copying the read-only memory of a pre-existing valid SFP module 36). The period of time in step 460 might, for example, be a period in the range of 6-12 months. The period of time in step 470 might, for example, be a period in the range of 6-12 months.

While various embodiments of the invention have been particularly shown and described, it will be understood by those skilled in the art that various changes in form and details may be made therein without departing from the spirit and scope of the invention as defined by the appended claims.

For example, while the determination of whether an SFP module is legacy or smart has been depicted as depending on whether CISCO or CISCO-VENDOR is stored within the "vendor name" field, it should be understood that the particular values that distinguish the smart and legacy devices as well as the particular fields that are used to store such values may vary, and the provided values and fields are merely examples.

It should be understood that although various embodiments have been described as being methods, software embodying these methods is also included. Thus, one embodiment includes a tangible computer-readable medium (such as, for example, a hard disk, a floppy disk, an optical disk, computer memory, flash memory, etc., but specifically excluding signals and other non-tangible media and phenomena) programmed with instructions, which, when performed by a computer or a set of computers, cause one or more of the methods described in various embodiments to be performed. Another embodiment includes a computer which is programmed to perform one or more of the methods described in various embodiments.

Furthermore, it should be understood that all embodiments which have been described may be combined in all possible combinations with each other, except to the extent that such combinations have been explicitly excluded or to the extent that such combinations are impossible.

What is claimed is:

1. An apparatus comprising:
   a first communications interface configured to communicatively couple to a network plug of a network cable;
   a second communications interface configured to communicatively couple to a network host device, the second communications interface being constructed and arranged to mount into an opening of the network host device, the network host device being constructed and arranged to receive and mount a standard small form-factor pluggable module in the opening;
   a microcontroller, the microcontroller being configured to perform transceiver functions between the first communications interface and the second communications interface; and
   authentication circuitry, the authentication circuitry being communicatively coupled with the microcontroller and the second communications interface, wherein, the authentication circuitry is configured to:
   determine whether the second communication interface is coupled to a legacy network host device or a smart network host device;
   provide contents of a magic code cookie to the network host device when the second communications interface is communicatively coupled to a legacy network host device; and
   perform a smart authentication procedure with the network host device when the second communications interface is communicatively coupled to a smart network host device, the smart authentication procedure utilizing a unique signature according to a time-based algorithm.

2. An apparatus as in claim 1 wherein the authentication circuitry is located on an authentication chip and the authentication chip includes:
   logic circuitry;
   firmware, the firmware storing:
   the magic code cookie;
   the unique signature; and
   hardening features, the hardening features protecting the contents of the firmware from being read from the authentication chip by an unauthorized external entity.

3. An apparatus as in claim 1 wherein the time-based algorithm cryptographically combines the current time with the unique signature and sends the result to the network host device for verification.

4. An apparatus as in claim 1 wherein:
   providing contents of the magic code cookie to the network host device verifies to the network host device that the apparatus was made by an approved manufacturer rather than by a non-approved manufacturer attempting to counterfeit; and
   the smart authentication procedure verifies to the network host device that the apparatus was made by an approved manufacturer rather than by a non-approved manufacturer attempting to counterfeit, the verification provided by the smart authentication procedure serving as a stronger indicator that the apparatus is not counterfeit as compared to providing contents of the magic code cookie to the network host device.

5. An apparatus as in claim 1 wherein the microcontroller is configured to perform the transceiver functions in response to providing contents of the magic code cookie to the network host device and the smart authentication being performed successfully.

6. A method comprising:
   producing a plurality of apparatuses as in claim 1;
   offering for sale the plurality of apparatuses to a plurality of customers, each customer currently having and operating at least one legacy network host device which is configured to receive standard small form-factor pluggable (SFP) modules;
   offering for sale to the plurality of customers, a smart network host device which is not compatible with legacy SFP modules; and
   after allowing a period of time to lapse after a customer of the plurality of customers has purchased a number of the apparatuses of claim 1, encouraging such customer to retire its legacy network devices in favor of smart network host devices.

7. An apparatus as in claim 1 wherein the authentication circuitry is located on an authentication chip, the authentication chip residing in a separate integrated circuit package as the microcontroller.

8. An apparatus comprising:
   an enclosure, the enclosure having a plurality of openings therein, each opening being constructed and arranged to receive a standard small form-factor pluggable (SFP) module; and
   a logic board mounted within the enclosure, the logic board including a controller and a plurality of signal connectors, each of the plurality of signal connectors aligning with a different opening of the plurality of openings such that an SFP module, when inserted into the opening, interfaces with the signal connector;
   wherein the controller is configured to:
   upon an SFP module being inserted into an opening and interfacing with a signal connector, determine if the SFP module is a legacy device or a smart device;
   upon determining that the SFP module is a legacy device, receive a magic code from the SFP module and determine if the magic code is a valid magic code; and upon determining that the SFP module is a smart device, perform a smart authentication procedure with the SFP module, the smart authentication procedure utilizing a unique signature according to a time-based algorithm.

9. An apparatus as in claim 8 wherein the controller, when determining if the SFP module is a legacy device or a smart device, is configured to:
receive contents of a vendor name field stored on the SFP module from the SFP module;
if the received contents store a first-predefined value, then determine that the SFP module is a smart module;
if the received contents store any other value other than the predefined value, then determine that the SFP module is a legacy module.

10. An apparatus as in claim 8 wherein the controller, when determining if the magic code is a valid magic code, is configured to:
receive identifying information from the SFP module;
cryptographically combine the received identifying information with a magic key stored in memory on the logic board to produce a computed magic code;
compare the received magic code with the computed magic code;
if the received magic code and the computed magic code are the same, then authenticate the SFP;
if the received magic code and the computed magic code are not the same, then identify the SFP as counterfeit.

11. An apparatus as in claim 8 wherein:
the controller, when performing the smart authentication procedure with the SFP module, is configured to:
receive a message from the SFP module; and
verify that the message was correctly encrypted in accordance with the time based algorithm using a current time as an encryption parameter.

12. An apparatus as in claim 8 wherein:
the controller is further configured to reject the SFP module as a counterfeit when the SFP module has been determined to be a legacy device and the magic code has been determined not to be valid;
the controller is further configured to accept the SFP module when the SFP module has been determined to be a legacy device and the magic code has been determined to be valid; and
performing the smart authentication procedure with the SFP module includes:
rejecting the SFP module as a counterfeit when the smart authentication procedure indicates that the SFP module was made by a non-approved manufacturer attempting to counterfeit; and
otherwise, accepting the SFP module.

13. An apparatus as in claim 12 wherein:
the controller is configured to perform telecommunication functions with the SFP module in response to accepting the SFP module; and
the controller is configured to refrain from performing telecommunication functions with the SFP module in response to rejecting the SFP module.

14. A method comprising:
producing a plurality of smart SFP modules, each smart SFP module including an authentication chip capable of:
performing a smart authentication with an apparatus as in claim 8; and
communicating a magic code to a legacy network host device;
offering for sale the plurality of smart SFP modules to a plurality of customers, each customer currently having and operating:
at least one legacy network host device which is configured to receive SFP modules; and
at least one legacy SFP module;
producing a plurality of apparatuses as in claim 8;
configuring each of the plurality of apparatuses as in claim 8 to be capable of receiving a signal indicating that the apparatus should no longer communicate with legacy SFP modules, such that if the apparatus receives such a signal, that apparatus will no longer communicate with legacy SFP modules;
offering for sale to the plurality of customers, the plurality of configured apparatuses;
after allowing a period of time to lapse after a customer of the plurality of customers has purchased a number of smart SFP modules, encouraging such customer to retire each of its legacy network host devices in favor of a configured apparatus; and
after allowing a period of time to lapse after that customer has retired all of its legacy network host devices in favor of configured apparatuses, encouraging that customer to:
retire all of its legacy SFP modules in favor of smart SFP modules; and
send, to each of its configured apparatuses, the signal indicating that that apparatus should no longer communicate with legacy SFP modules.

15. A method comprising:
upon a standard small form-factor pluggable (SFP) module being inserted into an SFP jack on a network host device, determining if the SFP module is a legacy device or a smart device;
upon determining that the SFP module is a legacy device, receiving a magic code from the SFP module and determining if the magic code is a valid magic code; and
upon determining that the SFP module is a smart device, performing a smart authentication procedure with the SFP module, the smart authentication procedure utilizing a unique signature according to a time-based algorithm.

16. A method as in claim 15 wherein determining if the SFP module is a legacy device or a smart device includes:
receiving contents of a vendor name field stored on the SFP module from the SFP module;
if the received contents store a first value, then determining that the SFP module is a smart module;
if the received contents store any other value, then determining that the SFP module is a legacy module.

17. A method as in claim 15 wherein determining if the magic code is a valid magic code includes:
receiving identifying information from the SFP module;
cryptographically combining the received identifying information with a magic key stored in memory of the network host device to produce a computed magic code;
comparing the received magic code with the computed magic code;
if the received magic code and the computed magic code are the same, then authenticating the SFP;
if the received magic code and the computed magic code are not the same, then identifying the SFP as counterfeit.

18. A method as in claim 15 wherein:
performing the smart authentication procedure with the SFP module includes:
receiving a message from the SFP module; and verifying that the message was correctly encrypted in accordance with the time-based algorithm using a current time as an encryption parameter.

* * * * *